United States Patent
Schnapp et al.

(10) Patent No.: US 8,281,090 B2
(45) Date of Patent: Oct. 2, 2012

(54) POOL SPARES FOR DATA STORAGE VIRTUALIZATION SUBSYSTEM

(75) Inventors: Michael Gordon Schnapp, Taipei Hsien (TW); Chieh-Wei Chen, Taipei Hsien (TW)

(73) Assignee: Infortrend Technology, Inc., New Taipei (TW)

( * ) Notice: Subject to any disclaimer, the term of this patent is extended or adjusted under 35 U.S.C. 154(b) by 442 days.

(21) Appl. No.: 11/539,647

(22) Filed: Oct. 9, 2006

(65) Prior Publication Data

US 2007/0078794 A1  Apr. 5, 2007

Related U.S. Application Data

(60) Provisional application No. 60/596,652, filed on Oct. 11, 2005.

(51) Int. Cl.
*G06F 12/00* (2006.01)
(52) U.S. Cl. ............... 711/162; 711/170; 711/E12.103
(58) Field of Classification Search .......... 711/114, 711/162, 170
See application file for complete search history.

(56) References Cited

U.S. PATENT DOCUMENTS

| | | | |
|---|---|---|---|
| 5,193,171 A * | 3/1993 | Shinmura et al. | 711/113 |
| 5,430,855 A * | 7/1995 | Walsh et al. | 710/10 |
| 7,024,586 B2 * | 4/2006 | Kleiman et al. | 714/6.32 |
| 7,574,623 B1 * | 8/2009 | Goel et al. | 714/47.2 |
| 2003/0212931 A1 | 11/2003 | Hetrick et al. | |
| 2004/0143718 A1 * | 7/2004 | Chen et al. | 711/202 |
| 2005/0015545 A1 * | 1/2005 | Liu et al. | 711/114 |
| 2005/0080986 A1 * | 4/2005 | Park | 711/103 |
| 2005/0114593 A1 * | 5/2005 | Cassell et al. | 711/114 |
| 2005/0182890 A1 * | 8/2005 | Yamagami | 711/4 |
| 2005/0283655 A1 * | 12/2005 | Ashmore | 714/7 |
| 2006/0015771 A1 * | 1/2006 | Van Gundy et al. | 714/7 |
| 2006/0149901 A1 * | 7/2006 | Sasage et al. | 711/114 |

FOREIGN PATENT DOCUMENTS

| | | |
|---|---|---|
| CN | 1598755 | 3/2005 |
| WO | 03/023597 | 3/2003 |

OTHER PUBLICATIONS

English abstract of CN1598755.

* cited by examiner

*Primary Examiner* — Kevin Ellis
*Assistant Examiner* — Aracelis Ruiz
(74) *Attorney, Agent, or Firm* — Thomas|Kayden

(57) ABSTRACT

A data storage virtualization subsystem (SVS) for providing storage to a host entity is disclosed. The SVS comprises a storage virtualization controller for connecting to the host entity, at least one physical storage device (PSD) pool, and at least one PSD is designated to be a pool spare PSD to the at least one PSD pool. The at least one PSD pool comprises at least one PSD to store user data or associated redundant information and is given a pool ID for identifying the PSD pool.

11 Claims, 7 Drawing Sheets

POOL SPARES FOR DATA STORAGE VIRTUALIZATION SUBSYSTEM

BACKGROUND OF THE INVENTION

1. Field of the Invention

The present invention relates to a data storage virtualization subsystem, and in particular, to a data storage virtualization subsystem providing at least one physical storage device (abbreviated PSD) pool formed by at least one PSD.

2. Description of the Related Art

Storage virtualization is a technology to virtualize physical storage by combining sections of physical storage devices (abbreviated PSDs), physical devices whose primary function it is to store data into logical storage entities, herein referred to as logical media units (LMUs) whose individual storage elements (e.g. storage blocks) are uniquely addressable by a logical storage address to make LMUs accessible to a host entity. Examples of PSDs are hard disk drives (abbreviated HDD), storage tapes, compact disk drives, etc. This technology has been used primarily in redundant array of independent disks (RAID) storage virtualization, which combines smaller PSDs into larger volume, fault tolerant, or higher performance LMUs.

A data storage virtualization subsystem (SVS) comprises at least one storage virtualization controller, abbreviated SVC, and at least one PSD connected thereto to provide LMUs to a host entity for large data storage therefor to execute the IO operations in response to the IO requests issued by the host entity to get the data stored in the PSDs corresponding to the LMU addresses. The primary purpose of the SVC is to map combinations of sections of PSDs to LMUs visible to a host entity, and to present each LMU to the host entity as if it were a directly connected PSD of which the LMU is supposed to be the logical equivalent. In order to accomplish this, IO requests sent out by the host entity to be processed by the SVC that would normally generate certain behavior in an equivalent PSD also generate logically equivalent behavior on the part of the SVC in relation to the addressed LMU. The result is that the host entity "thinks" it is directly connected to and communicating with a PSD while in actuality is connected to the at least one SVC that is simply emulating the behavior of the PSD of which the addressed LMU is the logical equivalent.

An external (sometimes referred to as "Stand-alone") storage virtualization controller is a storage virtualization controller (SVC) that connects to the host entity via an IO interface and that is capable of supporting connection to devices that reside external to the host entity and, in general, operates independently of the host entity. An example of an external SVC is an external, or stand-alone, direct-access RAID controller. A RAID controller combines sections on one or multiple physical storage devices (PSDs), the combination of which is determined by the nature of a particular RAID level, to form logical media units (LMUs) that are contiguously addressable by a host entity to which the LMUs are made available. A single RAID controller will typically support multiple RAID levels so that different LMUs may consist of sections of PSDs combined in different ways by virtue of the different RAID levels that characterize the different LMUs.

Another example of an external SVC is a JBOD emulation controller. A JBOD, short for "Just a Bunch of Drives", is a set of PSDs that connect directly to a host entity via one or more IO device interconnects. A further example of an external SVC is a controller for an external tape backup subsystem.

It is straight to understand that the more PSDs an SVS provides, the higher possibility the SVS encounters a failed PSD. For a LMU configured to have redundant data and to support data rebuilding function, when a member PSD of the LMU is failed, the LMU will enter a "degraded mode", which means that the LMU is under a situation of lower data integrity protection than that of a normal situation. The data rebuilding function will be triggered if a spare PSD is available. If there is not any spare PSD for data rebuilding in the SVS, users need to stop the whole system to replace the failed PSD to keep the LMU in a normal state rather than in a degraded mode. In the present specification, the PSDs used for storing user data or associated redundant data are referred to "normally-used PSDs", and the PSDs used as substitutes for normally-used PSDs are referred to "spare PSDs". In the viewpoint of economic efficiency, in an SVS having a fixed number of PSDs, the less PSDs are designated as spare PSDs, the higher storage capacity for storing user data and associated redundant data is, and so is the economic efficiency of the SVS. However, the more normally-used PSDs a spare PSD is to support, the lower possibility a normally-used PSD can be supported by the spare PSD when needed because of the higher chance that the spare PSD might have been used as a normally-used PSD in place of another normally-used PSD failed earlier. A conventional solution for such a situation is to provide a type of "global spare PSD" to supply backup capability to all LMUs within an SVS. Another conventional solution is to provide a type of "local spare PSD" to supply backup capability to a specific LMU, and we call such characteristic of a local spare PSD is "dedicated".

FIG. 1 shows an exemplary solution of spare physical storage devices of SVS in the prior art, wherein the data storage virtualization subsystem (SVS) 20 comprises a storage virtualization controller (SVC) 100 and a plurality of physical storage devices (PSDs) 130-1 to 130-24 connected to the SVC 100. In the present embodiment, the SVC 100 and the PSDs 130-1~130-8 are received in an enclosure 120-1, the PSDs 130-9~130-16 are received in an enclosure 120-2, and the PSDs 130-17~130-24 are received in an enclosure 120-3. The enclosure 120-2 is connected to the enclosure 120-1 through an expansion port through which PSDs in other enclosures are allowed to be connected thereto. The PSDs depicted by solid lines represent the normally-used PSDs, and the PSDs depicted by dashed lines represent spare PSDs. The logical media unit (LMU) 140-1 comprises the normally-used PSDs 130-1, 130-2, 130-9, 130-10, and 130-17, and is provided with a local spare PSD 130-7. The LMU 140-2 comprises the normally-used PSDs 130-3, and 130-4 and is provided with a local spare PSD 130-8. The LMU 140-3 comprises the normally-used PSDs 130-11, 130-12, 130-18, 130-19, and 130-20, and is provided with a local spare PSD 130-23. The LMU 140-4 comprises the normally-used PSDs 130-5, 130-6, 130-13, 130-14 and is provided with a local spare PSD 130-15. The LMU 140-5 comprises the normally-used PSDs 130-21 and 130-22 and is provided with a local spare PSD 130-24. In addition, a global spare PSD 130-16 is provided to the SVS 20. A local spare PSD is a spare PSD dedicated to the PSDs of a designated LMU; that is, when needed, the local spare PSD can be a substitute for any of the PSDs belonging to the designated LMU. For example, the local spare PSD 130-7 of LMU 140-1 is dedicated to all the normally-used PSDs of LMU 140-1, i.e., the PSDs 130-1, 130-2, 130-9, 130-10, and 130-17, and when necessary, PSD 130-7 can be used as a substitute for any of the PSDs 130-1, 130-2, 130-9, 130-10, and 130-17. On the other hand, global spare PSD 130-16 supplies backup capability to all the normally-used PSDs 130-1~130-6, 130-9~130-14, and 130-17~130-22 of all LMUs 140-1~140-5 within the SVS 20, that is, when needed, the global spare PSD 130-16 can be a substitute for any of the PSDs belonging to the SVS 20.

One or more of the normally-used PSDs and spare PSDs 130-1~130-24 have a configuration information inside. The configuration information of a PSD may comprise the information associated with the LMU, or the recording of the spare status of the PSD if the PSD is designated as a spare PSD, wherein the spare status indicates that the PSD is either a local spare PSD or a global spare PSD. The configuration information of PSD(s) is stored in the memory (not shown) of the SVC 100 when the SVS 20 is switched on. The stored configuration information is then used to reflect the relationship between all the LMUs and spare PSDs for the SVC to identify the PSDs to which a spare PSD supplies backup capability.

However, these two types of conventional spare PSD definitions are not flexible enough because the serving range of a spare PSD can only be defined to either a specific LMU or the whole SVS.

SUMMARY OF THE INVENTION

It is an object of the present invention to provide a data storage virtualization subsystem (SVS) for providing data storage space to a host entity, the SVS comprising: a storage virtualization controller (SVC) for connecting to the host entity; and at least one physical storage device (PSD) pool, comprising at least one PSD to store user data or associated redundant information; and a pool ID for each of the at least one PSD pool; whereby at least one PSD is designated as a pool spare PSD to a said at least one PSD pool.

It is another object of the present invention to provide a method comprising the step of: checking the spare table to determine whether there is an available pool spare PSD designated to the PSD pool.

It is another object of the present invention to provide a spare physical storage device (PSD) designating method for a data storage virtualization subsystem having a plurality of PSDs, the method comprising the steps of: defining a PSD pool; and designating at least one PSD as a spare PSD to said PSD pool.

It is another object of the present invention to provide a method for selecting a spare PSD to use in a SVS comprising a PSD pool, a pool spare PSD designated to said PSD pool, and at least one non-pool spare PSD, the method comprising the steps of: selecting the pool spare PSD as a spare PSD to use in the PSD pool if the pool spare PSD is available; and selecting the non-pool spare PSD as a spare PSD to use in the PSD pool if the pool spare PSD is not available.

It is another object of the present invention to provide a method for defining PSD pool to use in a SVS, the method comprising the steps of: assigning at least one of the PSDs to store user data or associated redundant information; and giving a pool ID to identify the PSD pool.

DETAILED DESCRIPTION OF THE PREFERRED EMBODIMENTS

Figure 1:
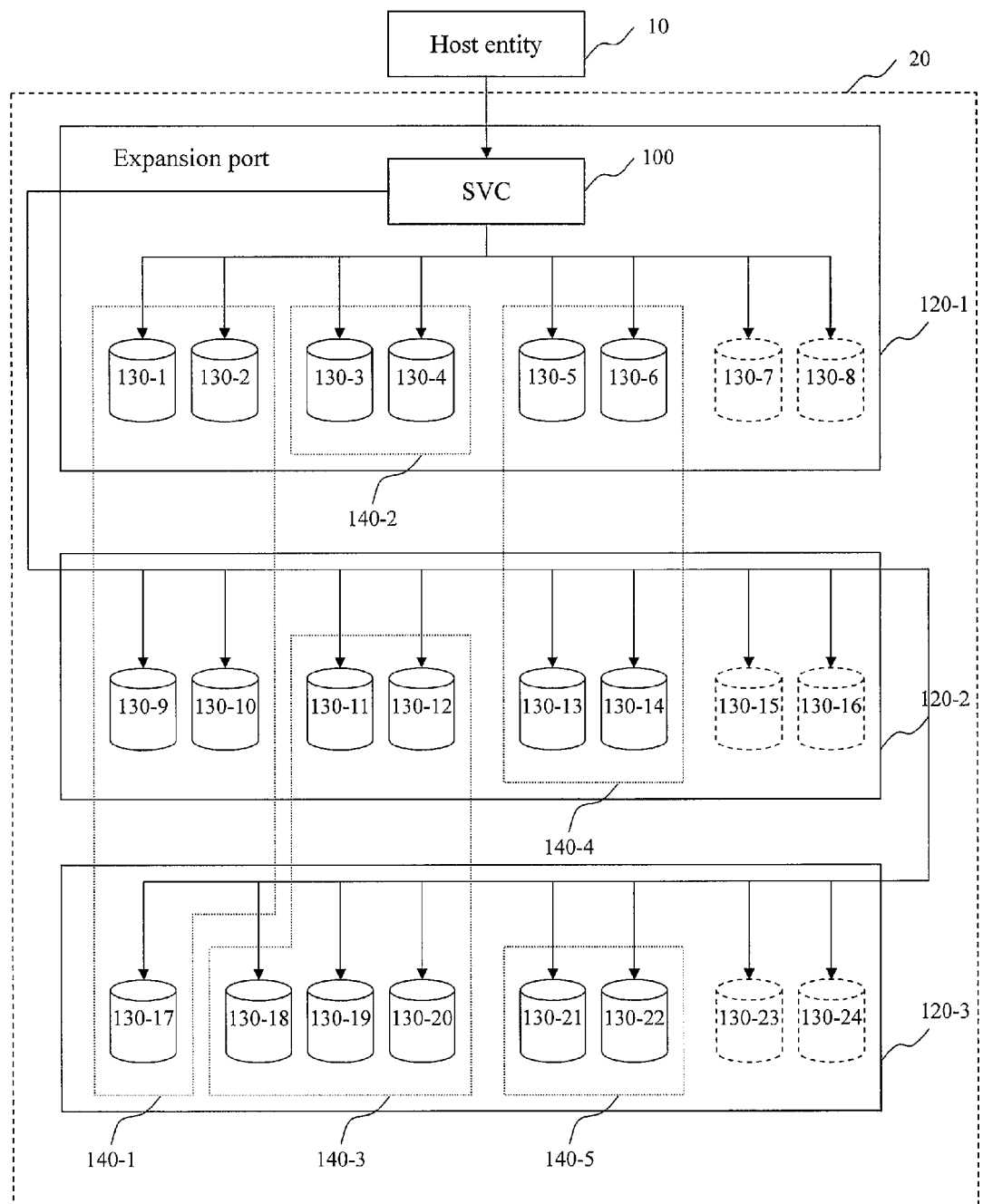
FIG. 1 shows an exemplary prior solution of spare physical storage devices of a data storage virtualization subsystem (SVS).
Figure 2A:
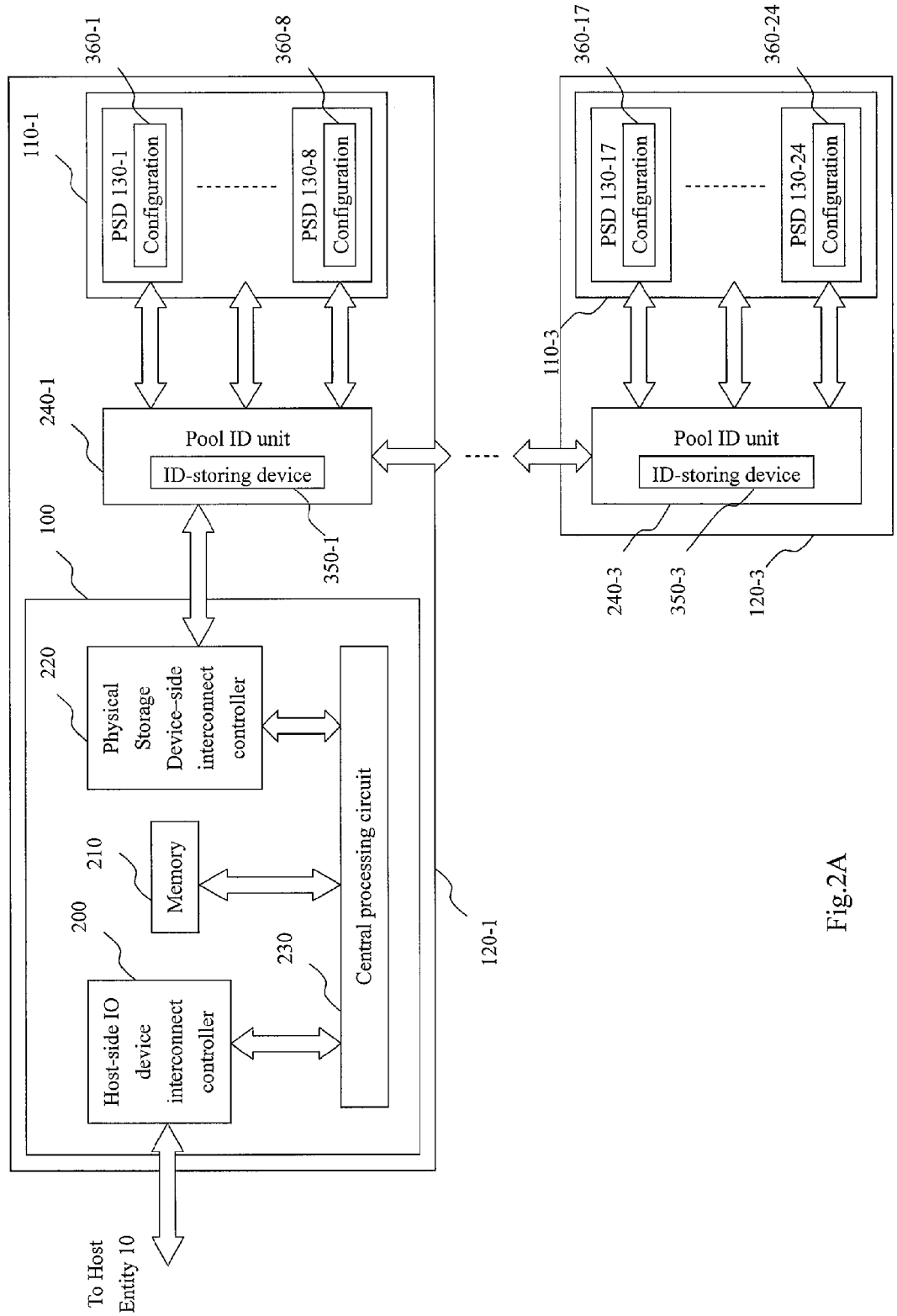
FIG. 2A shows a block diagram of a first embodiment of the present invention.
Figure 2B:
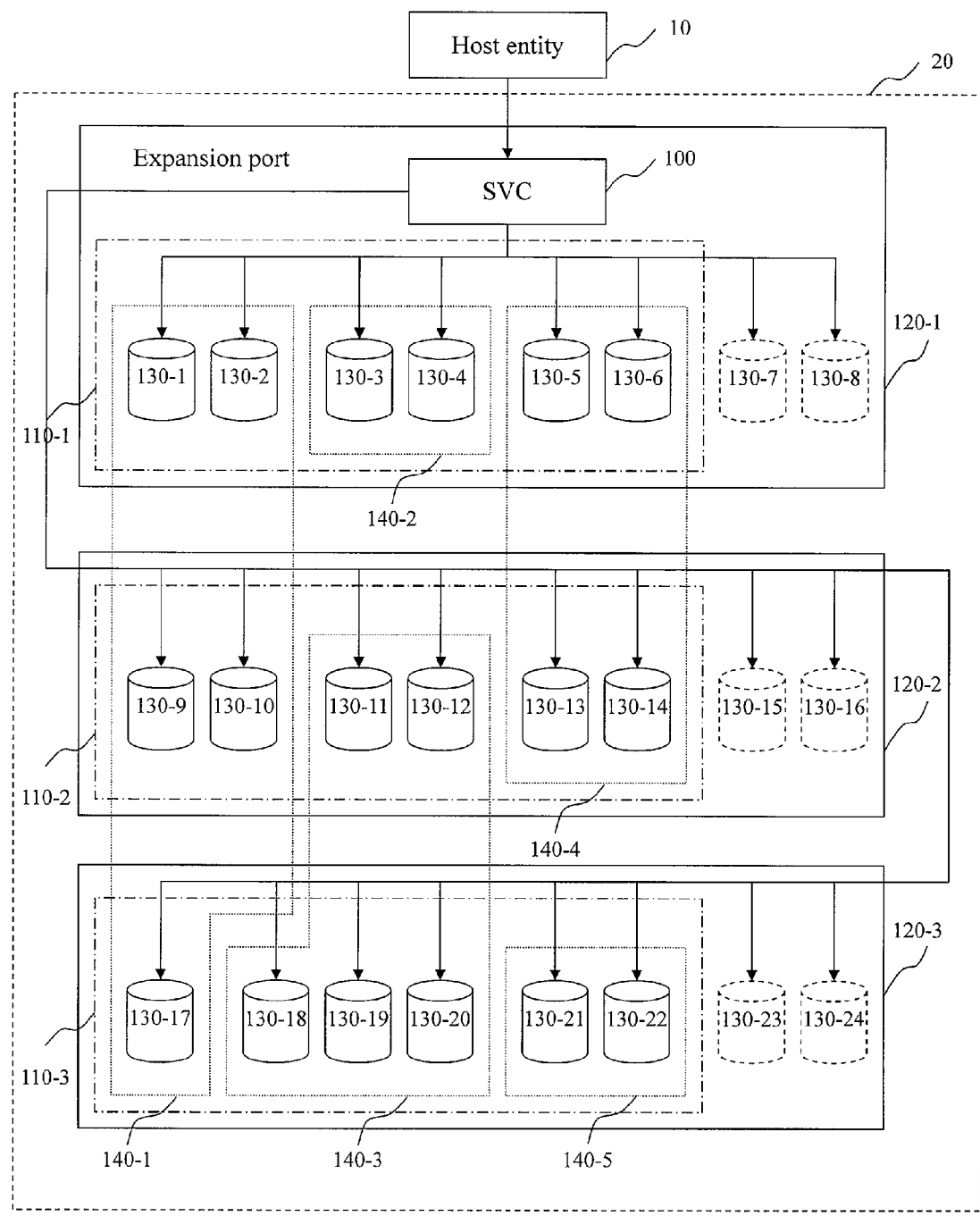
FIG. 2B shows another diagram of the first embodiment of the present invention.

Please refer to both FIG. 2A and FIG. 2B for understanding the first embodiment of the present invention, where FIG. 2A shows a block diagram of the first embodiment of the present invention, and FIG. 2B shows another diagram of the first embodiment. In the present embodiment, the SVS 20 comprises an SVC 100, such as but not limited to, one stand-alone RAID SVC, and a plurality of PSDs 130 attached thereto. Although there is only one SVC 100 provided in the SVS 20 shown, there could be more than one SVC configured redundantly, e.g., two redundantly-configured SVCs 100 to form a redundant SVS, in which if one of the redundantly-configured SVCs fails, another SVC thereof will take over the functionality of the failed SVC. The storage virtualization controller (SVC) 100 comprises several functional blocks, such as but not limited to, a host-side IO device interconnect controller 200, a memory 210, a physical storage device-side interconnect controller 220, and a central processing circuit (CPC) 230. Although all blocks in FIG. 2A are illustrated in separate functional blocks, two or more or even all of these functional blocks can be incorporated into one chip in practical implementation.

The host-side IO device interconnect controller 200 is connected to the host entity 10 and the CPC 230 to serve as an interface and buffer between the SVC 100 and the host entity 10, and receives IO requests and related data from the host entity 10, and maps and/or transfers them to the CPC 230. The host-side IO device interconnect controller 200 comprises one or more host-side ports for coupling to the host entity 10. Some common port types that might be incorporated here are: Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode.

When the CPC 230 receives the IO requests of the host entity 10 from the host-side IO device interconnect controller 200, the CPC 230 parses it and performs some operations in response to the IO requests, and sends the data requested and/or reports and/or information from the SVC 100 back to the host entity 10 through the host-side IO device interconnect controller 200.

The PSDs 130 comprise a first set of PSDs 130-1~130-8 in a first enclosure 120-1, a second set of PSDs 130-9~130-16 in a second enclosure 120-2, and a third set of PSDs 130-17~130-24 in a third enclosure 120-3. Note that, the SVC 100 can either be in the first enclosure 120 with the first set of PSDs or be outside of the first enclosure 120, although in the present embodiment, the SVC 100 is received inside the first enclosure 120. A PSD pool is defined to comprise at least one normal-used PSD, and a pool ID is given thereto for identifying the PSD pool. The pool ID can be stored in the configuration information of at least one PSD, or in an ID-storing device of a pool ID unit. If the pool ID of a pool is stored in the configuration information of at least one designated pool spare PSD or at least one normal-used PSD belonging to the pool to which the spare PSD is designated, i.e., the owner of the pool spare will not change unless the configuration information is changed first, probably by a user. However, if the pool ID of a pool is stored in an ID-storing device of a pool ID unit, the pool (spare owner) to which a pool spare PSD is designated can be changed by removing the spare PSD from the pool and inserting it into an alternate pool. In this specification, this characteristic will be described in more detail later. In the present embodiment, each of the PSDs 130 is either a normal-used PSD or a spare PSD, and three pools 110-1, 110-2, and 110-3 are defined complying with the enclosures 120-1, 120-2 and 120-3, i.e., the PSDs in the same enclosure are defined as a pool, except for the spare PSD. The pool 110-1 comprises PSDs 130-1~130-6, and each of the PSDs 130 has configuration information 360 stored therein. A first pool ID for identifying the pool is given thereto and stored in an ID-storing device 350. The pool 110-2 comprises PSDs 130-9~130-14, and each of the PSDs 130 has configuration information 360 stored therein. A second pool ID for identifying the pool is given thereto and stored in an ID-storing device 350-2 (not shown). The pool 110-3 comprises PSDs 130-17~130-22, and each of the PSDs 130 has configuration information 360 stored therein. A third pool ID for identifying the pool is given thereto and stored in an ID-storing device 350-3. When users designate a PSD to be a pool spare PSD, the PSD will be designated as a pool spare PSD in at least one configuration information. After a PSD is designated to a pool as a spare PSD, it can be used as a substitute for the PSD in the pool when needed. In other embodiments, there could exist in an SVS some not-used PSDs, which are neither configured as normally-used PSDs nor configured as spare PSDs.

The ID-storing device 350-1 (350-3) provided can be provided on a pool ID unit 240-1 (240-3) in the pool 110-1 (110-3). The primary function of the pool ID is to point out which one or more PSDs belong to in a specific PSD pool. The ID-storing device 350 is a device for storing the pool ID setting, such as but not limited to, a memory, or a switch. The pool ID can be set by users, SVC, or manufactures of the SVS. In the present embodiment, an exemplary implementation of the ID-storing device 350 is a switch having a plurality of states to set, and the pool ID can be preset in the manufacture factory. The pool ID unit 240 is the device that is connected to the PSDs 130 and the SVC 100 for providing pool ID to the SVC 100, such as but not limited to, a backplane, which is a PSD connecting circuit board that is provided in an enclosure for the PSDs 130.

When the SVS is switched on, through the pool ID unit 240, the SVC 100 obtains and stores the configuration information 360 and the pool ID(s) stored in the ID-storing device 350, into the memory of the SVC to identify which PSD 130 is inside the pool 110 designated by the pool ID. The configuration information and the pool ID are then arranged to form a spare table that provides the relation information between the one or more PSDs, the one or more LMUs and the one or more PSD pools to the SVC, such as but not limited to, which PSDs form a LMU, which PSD is the local spare PSD for a certain LMU, which PSD is a global spare PSD, which one or more PSDs form a PSD pool, and which PSD is the pool spare PSD for a certain PSD pool. The spare table stored on the memory of the SVC and formed by combining the configuration information and the pool ID can be utilized by the SVC to identify the PSD to which a pool spare PSD supplies backup capability.

Referring to FIG. 2B, the SVS 20 maps PSDs 130 having configuration information (not shown) that is stored therein to form the logical media units (LMU) 140-1~140-5 presented to the host entity 10. The LMU 140-1 is formed by five normally-used PSDs 130-1, 130-2, 130-9, 130-10, and 130-17, the LMU 140-2 is formed by two normally-used PSDs 130-3, and 130-4, the LMU 140-3 is formed by five normally-used PSDs 130-11, 130-12, 130-18, 130-19, and 130-20, the LMU 140-4 is formed by four normally-used PSDs of 130-5, 130-6, 130-13, 130-14, the LMU 140-5 is formed by two normally-used PSDs of 130-21, and 130-22. The PSDs depicted by solid lines represent for the normally-used PSDs, and the PSDs depicted by dashed lines represent spare PSDs. The SVS 20 further comprises six pool spare PSDs 130-7, 130-8, 130-15, 130-16, 130-23, 130-24. The PSD pool 110-1 comprises PSDs 130-1-130-6 and is provided with the pool spare PSDs 130-7, 130-8. The PSD pool 110-2 comprises PSDs 130-9~130-14 and is provided with the pool spare PSDs 130-15, 130-16. The PSD pool 110-3 comprises PSDs 130-17~130-22 and is provided with the pool spare PSDs 130-23, 130-24.

In the present embodiment shown in FIGS. 2A and 2B, the characteristic of storing the pool ID in the ID-storing device rather than storing in the configuration information is as follows. Since the pool IDs are stored in the ID-storing devices 350, if one of the PSDs 130 is designated as a pool spare PSD of one of the pools 110, e.g., the first pool 110-1, in the configuration information 360 thereof, after the pool spare PSD is removed from the pool 110 and then inserted into another pool 110, e.g., the second pool 110-2, of the same SVS, the second pool 110-2 rather than the first pool 110-1 will be recognized as the owner of the pool spare PSD. The detailed process of this further comprises a procedure to update the spare table in the SVC 100 after the pool spare PSD is inserted back into the second pool 110-2 of the same SVS 20. In the present embodiment, the updating procedure can be done in the resetting, while in another embodiment, the updating procedure can be done automatically. During the updating procedure, the SVC 100 obtains both the configuration information 360 through the second pool ID unit 240-2 and the second pool ID stored in the second ID-storing device 350-2 (rather than the first pool ID stored in the first ID-storing device 350-1) to identity that the PSD 130 is a pool spare PSD of the second PSD pool 110-2, and the SVC stores the obtained configuration information 360 and the pool ID in its memory. The result is that the designated pool of the pool spare PSD stored on the memory of the SVC is changed. When a pool spare PSD designation is changed according to the enclosure where it is located, and it is also called an enclosure spare.

In another embodiment, for an SVS having a plurality of enclosures of PSDs distributed over buildings, a PSD pool can be defined to comprise all of the normally-used PSDs within a building, or to comprise a portion of the normally-used PSDs within a building. In a further embodiment where an SVS provides two PSD pools distributed over two buildings, all of the normally-used PSD(s) of the enclosure(s) in a first building belong to a first PSD pool, and a first pool ID is stored in all of the ID-storing device(s) of the pool ID unit(s), while on the other hand, all of the normally-used PSD(s) of the enclosure(s) in a second building belong to a second PSD pool, and a second pool ID is stored in all of the ID-storing device(s) of the pool ID unit(s). In this embodiment, for example, an implementation example of the pool ID unit can be a backplane, and the ID-storing unit can be a memory or a switch. If the ID-storing unit is a memory, it can be a non-volatile memory, such as but not limited to, an EEPROM, or a volatile memory, such as but not limited to, a DRAM. If a PSD is designated to be designated as a pool spare PSD in the first PSD pool of the SVS, the pool spare PSD would always be recognized to belong to the first PSD pool as long as the pool spare PSD is connected to any of the enclosure(s) in the first building to ensure that the SVC can get the same pool ID, the first pool ID, to identify the PSD pool of the pool spare PSD. However, if the pool spare PSD is connected to any of the enclosure(s) of the second building after the spare PSD is designated to be a pool spare PSD of the first PSD pool, and then the SVS updates the spare table which can be done either in the SVS resetting or in automatic updating procedure. After the spare table is updated, the pool spare PSD will also be recognized as a pool spare PSD, but belong to the second PSD pool, because the SVC will now obtain the second pool ID stored in the enclosure(s) of the second building for identifying the pool spare PSD.

In the present embodiment, the PSD pool definition confined in a building provides an advantage of independency between data stored in PSDs that are located in enclosure(s) of different buildings because the possibility to use the pool spare PSD in a first building as a substitute to store the data of another PSD in a second building is declined. In this case, when one of the buildings encounters an unforeseen happening that could corrupt the operations of the PSD pool in the building, such as but not limited to, a power failure event or a fire accident, the data availability and data integrity of another building are ensured by the PSD pool barrier. Because the two PSD pools define the serving region of a pool spare PSD, once a normally-used PSD in a PSD pool needs a spare PSD as a backup, a pool spare PSD of the PSD pool located in the building rather than in a pool spare PSD of another pool located in another building could function as a substitute for the normally-used PSD. As such, the data of each building are protected from being stored in another building.

Moreover, the number of PSD pool in a building of a SVS is also flexible. In one more embodiment, a SVS provides three PSD pools distributed over two different buildings, and a first PSD pool is defined to comprise all of the PSD(s) of the enclosure(s) of a building, and the other two PSD pool are defined to comprise at least one normally-used PSD of at least one enclosure in another building. In another embodiment, where an SVS also provides three PSD pools distributed over two different buildings, a first enclosure in a first building is a first PSD pool, and a first pool ID in a first ID-storing device of a first pool ID unit is stored in the first enclosure; a second enclosure in the first building is a second PSD pool, and a second pool ID in a second ID-storing device of a second pool ID unit is stored in the second enclosure; and a third enclosure in a second building is a third PSD pool, and a third pool ID in a third ID-storing device of a third pool ID unit is stored in the third enclosure. Thus, the data of each building remain independent of another building, and more precisely, the data of each PSD pool of the SVS are all independent.

In another embodiment, it could be that the spare table does not have to have been fulfilled during the SVC's being switched on, probably just because of lacking the necessary spare PSD information. The spare table can be fulfilled for carrying the information of the spare PSD(s) at a later time when a PSD of a PSD pool needs a spare PSD as a substitute PSD rather than at the time when the generation of the spare table is made upon the SVS being switched on. Thus, when the above-mentioned need appears, the SVC takes a period of time to obtain and store the information of spare PSD(s) stored in the configuration information of at least one PSD of the PSD pool and the pool ID of the PSD pool to fulfill the spare table of the PSD pool to be referenced.

Figure 3:
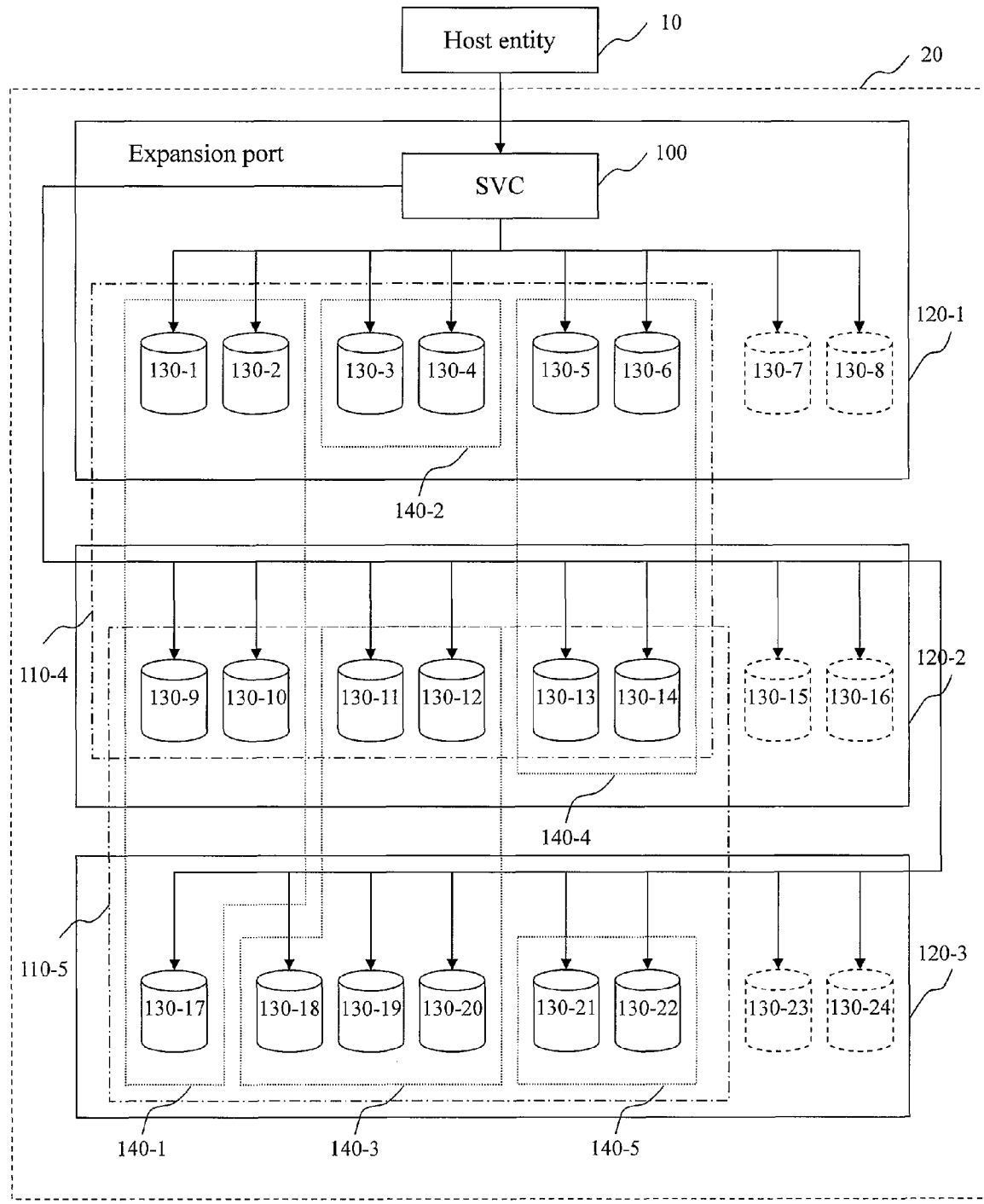
FIG. 3 shows a second embodiment of the present invention.

FIG. 3 shows a second embodiment of the present invention. The exemplary data storage virtualization subsystem (SVS) 20 shown in FIG. 3 comprises a SVC 100 and a plurality of PSDs 130 connected thereto. The PSDs depicted by solid lines represent for the normally-used PSDs and the PSDs depicted by dashed lines represent spare PSDs. The configuration of the SVS 20 and the LMUs 140-1~140-5 shown in FIG. 3 is defined in the same manner as that shown in FIG. 2B for simplifying the description rather than limiting the scope of the present invention. All the PSDs 130-1~130-24 are received in three enclosures 120-1, 120-2, 120-3 and grouped into two PSD pools 110-4, 110-5. The first PSD pool 110-4 is defined to comprise all the normally-used PSDs 130-1~130-6, and 130-9~130-14 of enclosures 120-1 and 120-2, and the second PSD pool 110-5 comprises all the nornally-used PSDs 130-9~130-14, and 130-17~130-22 of enclosures 120-2 and 120-3. The PSD pool 110-4 are provided with four pool spare PSDs 130-7, 130-8, 130-15, 130-16 designated in one or more configuration information therein, and the PSD pool 110-5 are provided with four pool spare PSDs 130-15, 130-16, 130-23, 130-24 designated in one or more configuration information therein. In the present embodiment, the pool ID (not shown) is stored in an ID-storing device (not shown), which can be at least one switch or at least one memory provided on the pool ID unit (not shown), which can be a backplane. In the ID-storing device of the pool ID unit of the enclosure 120-2, both pool IDs of PSD pools 110-4 and 110-5 are stored. While in an ID-storing device of the pool ID unit of the enclosure 120-1, only a pool ID of PSD pool 110-4 is stored, and in an ID-storing device of the pool ID unit of the enclosure 120-3, only a pool ID of PSD pool 110-5 is stored, too. In the viewpoint of the normally-used PSDs 130 of the enclosure 120-2, all six pool spare PSDs 130-7, 130-8, 130-15, 130-16, 130-23, and 130-24 can be a substitute when there is a need, such as PSD failure or else, for such substitute to any normally-used PSD 130 of the enclosure 120-2. The configuration information can be provided either in all or in a portion of the PSDs 130.

Figure 4:
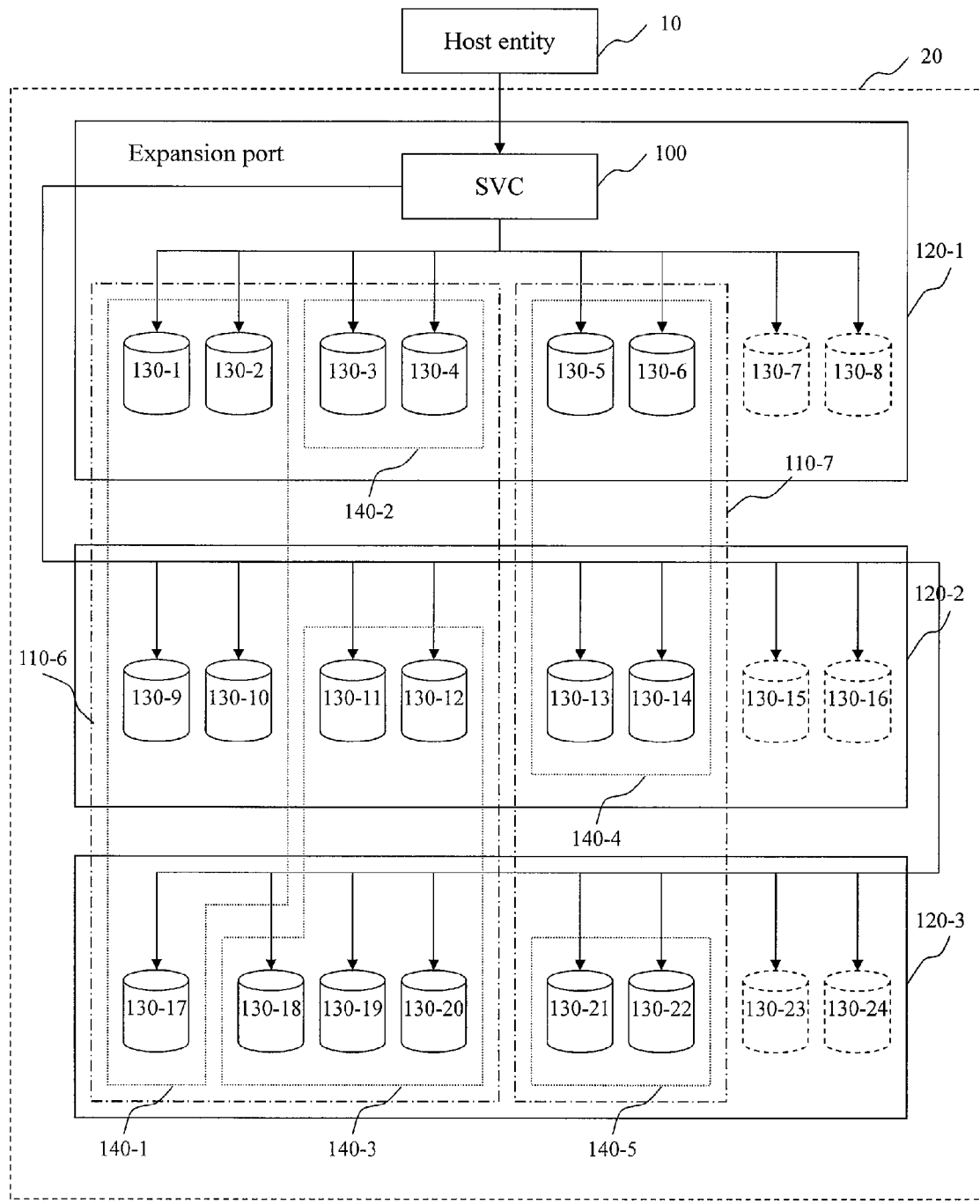
FIG. 4 shows a third embodiment of the present invention.

FIG. 4 shows a third embodiment of the present invention. The exemplary data storage virtualization subsystem (SVS) 20 shown in FIG. 4 comprises a SVC 100 and a plurality of PSDs 130 connected thereto. The PSDs depicted by solid lines represent for the normally-used PSDs, and the PSDs depicted by dashed lines represent spare PSDs. The configuration of the SVS 20 and the LMUs 140-1~140-5 shown in FIG. 2B is defined in the same manner as that shown in FIG. 2B for simplifying the description rather than limiting the scope of the present invention. All the PSDs 130-1~130-24 are received in three enclosures 120-1, 120-2, 120-3 and grouped into two PSD pools 110-6 and 110-7. The pool 110-6 shown in FIG. 4 comprises the normally-used PSDs 130-1, 130-2, 130-9, 130-10, 130-17, 130-3, 130-4, 130-11, 130-12, 130-18, 130-19, and 130-20 of LMUs 140-1, 140-2, and 140-3. The pool 110-7 comprises the normally-used PSDs 130-5, 130-6, 130-13, 130-14, 130-21, and 130-22 of the LMUs 140-4, 140-5. The PSD pool 110-6 provides four pool spare PSDs 130-7, 130-15, 130-23, and 130-24 designated in one or more configuration information therein, and PSD pool 110-7 provides two pool spare PSDs 130-8, and 130-16 designated in one ore more configuration information therein. The configuration information can be provided either in all or in a portion of the PSDs 130. In the present embodiment, the pool ID (not shown) and the information that includes which normally-used PSD(s) 130 forms a PSD pool 110, are stored in the configuration information of at least one PSD of each PSD pool 110, or stored in the configuration information of the at least one of the designated pool spare PSD(s) 130 rather than being stored in an ID-storing device of a pool ID unit. For example, a first pool ID of pool 110-6 is stored in the configuration information of at least one of the normally-used PSDs 130-1~130-4, 130-9~130-12, and 130-17~130-20, and of the pool spare PSDs 130-7, 130-15, 130-23, and 130-24. As such, the belonged PSD pool of a pool spare PSD 130 of a first pool 110 is not changed from a first pool 110 to a second pool 110 simply by removing the spare PSD 130 from the first pool 110 and inserting it into the second pool 110 with the updating of the SVS 20 to get a updated spare table, because these above-mentioned steps will not change the pool ID stored in the PSD 130 while the pool ID is a key to recognize the pool 110 to which the PSD 130 belongs.

Figure 5:
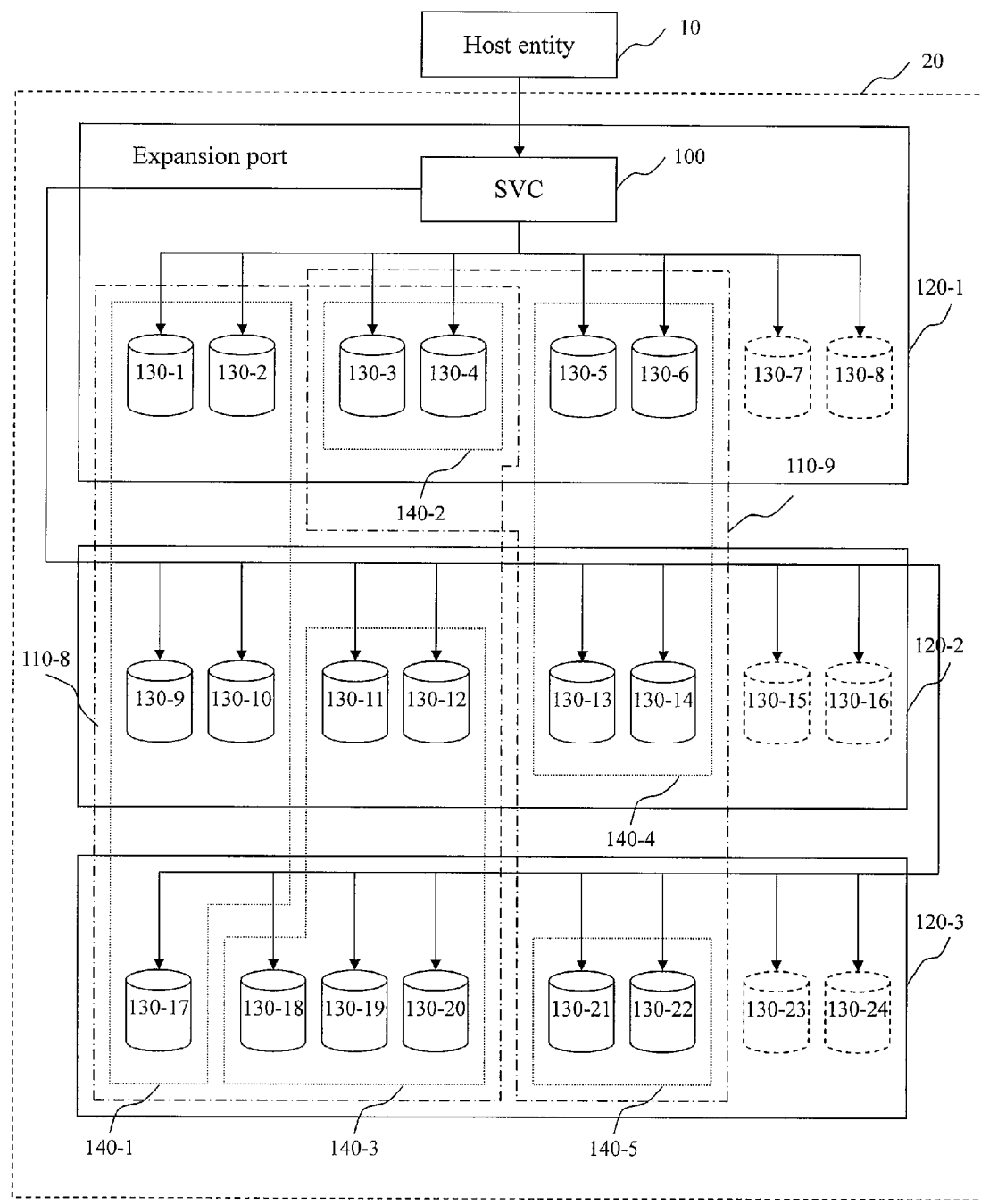
FIG. 5 shows a fourth embodiment of the present invention.

FIG. 5 shows a fourth embodiment of the present invention. The exemplary data storage virtualization subsystem (SVS) 20 shown in FIG. 5 comprises a SVC 100 and a plurality of PSDs 130 connected thereto. The PSDs 130 depicted by solid lines represent the normally-used PSDs 130, and the PSDs 130 depicted by dashed lines represent spare PSDs 130. The configuration of the SVS 20 and the LMUs 140-1~140-5 shown in FIG. 5 is formed in the same manner as that shown in FIG. 2B for simplifying the description rather than limiting the scope of the present invention. All the PSDs 130-1~130-24 are received in three enclosures 120-1, 120-2, 120-3, and are grouped into two PSD pools 110-8 and 110-9. The PSD pool 110-8 comprises the normally-used PSDs 130-1, 130-2, 130-9, 130-10, 130-17, 130-3, 130-4, 130-11, 130-12, 130-18, 130-19, and 130-20 of the LMUs 140-1, 140-2, 140-3. The PSD pool 110-9 comprises the normally-used PSDs 130-3, 130-4, 130-5, 130-6, 130-13, 130-14, 130-21, and 130-22 of the LMUs 140-2, 140-4, 140-5. The PSD pool 110-8 is provided with four pool spare PSDs 130-7, 130-15, 130-23, and 130-24 in the configuration information therein, and the PSD pool 110-9 is provided with two pool spare PSDs 130-8, and 130-16 in the configuration information therein. In the present embodiment, both a pool ID (not shown) and the information of which normally-used PSD(s) 130 form(s) a PSD pool 110, are stored in the configuration information of at least one of the normally-used PSD(s) 130 of each PSD pool 110, or stored in the configuration information of the at least one of the designated pool spare PSD(s) 130 rather than stored in a ID-storing device of a pool ID unit. In the configuration information of the PSDs 130-3 and 130-4, both pool IDs of PSD pools 110-8 and 110-9 are stored. While in the configuration information of the PSDs 130-1, 130-2, 130-9, 130-10, 130-17, 130-11, 130-12, 130-18, 130-19, and 130-20, only a pool ID of PSD pool 110-8 is stored, and the configuration information of the PSDs 130-5, 130-6, 130-13, 130-14, 130-21, and 130-22, only a pool ID of PSD pool 110-9 is stored, too. In the viewpoint of the normally-used PSDs 130-3 and 130-4, all six pool spare PSDs 130-7, 130-8, 130-15, 130-16, 130-23, and 130-24 could be a substitute for any normally-used PSD 130 of the enclosure 120-2 when there is a need, such as PSD failure or other situation, for such substitute to the normally-used PSDs 130-3 or 130-4. The configuration information can be provided either in all or in a portion of the PSDs 130.

In another embodiment, the SVC can use at least one pool spare PSD to rebuild the data stored in a failed normally-used PSD through referencing the spare table that is generated during the SVC's being switched on to find an available pool spare PSD as a substitute for the failed normally-used PSD. The details are as follows, after the SVC is aware of the existence of the failed normally-used PSD, the first step of the SVC is to reference the spare table to see if the PSD pool of the failed normally-used PSD records any pool spare PSD, then the second step is to determine if any of the recorded pool spare PSD is available to be a substitute for the failed normally-used PSD according to the storage volume and/or the type of the pool spare PSD, etc. If the storage volume of the recorded pool spare PSD is smaller than that of the failed normally-used PSD, the data stored in the failed normally-used PSD obviously cannot be fully rebuilt in the pool spare PSD, and this is one of the reasons why the SVC would determine that the pool spare PSD is not available to the failed normally-used PSD. If the SVC determines that none of the recorded pool spare PSDs is available, the SVC cannot rebuild the data stored in the failed normally-used PSD. If one of the found pool spare PSD is available to the failed PSD, the SVC would rebuild the data stored in the failed normally-used PSD in the available pool spare PSD to protect data integrity of the SVS.

In the further embodiment, when users or the SVC intend(s) to designate a PSD to be a pool spare PSD, the SVC determines if the storage volume or the type of the PSD is able to rebuild the data stored in any normally-used PSD of the PSD pool and maintain data integrity first, rather than determining this property of a pool spare PSD after the SVC realizes the existence of a failed normally-used PSD.

Please note that since a PSD pool is defined for the purpose of designating a pool spare PSD thereto, whether the pool spare PSD is defined in the PSD pool or not does not influence essence of the present invention if in that definition the pool spare PSD works with the pool spare definition. Therefore, it is intended that the present invention comprises both situations.

Figure 6:
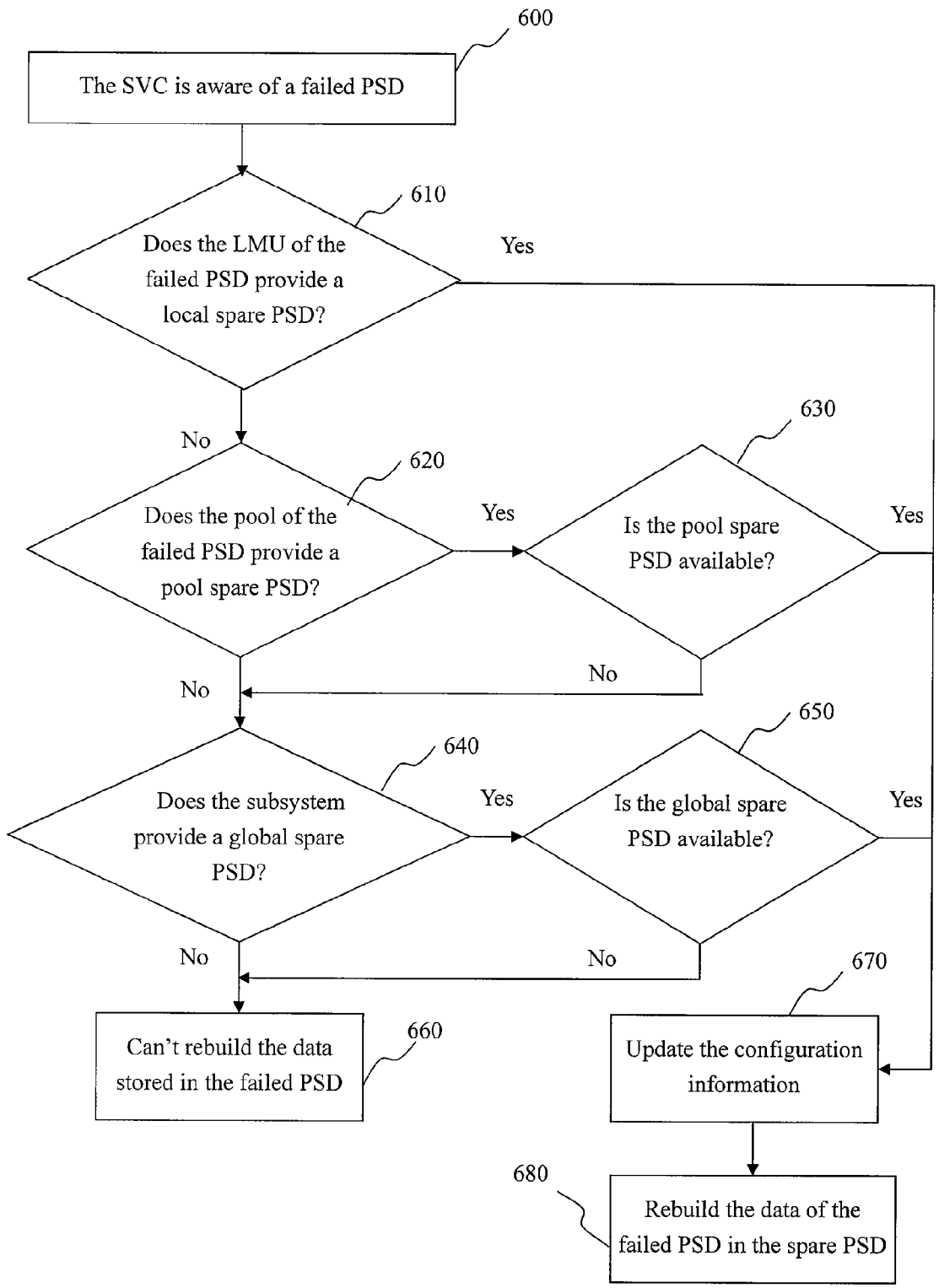
FIG. 6 shows an embodiment of the data rebuilding control flow of the storage virtualization controller according to the present invention.

FIG. 6 shows an embodiment of the data rebuilding control flow of the storage virtualization controller according to the present invention. In the present embodiment, the SVS could provide not only a pool spare PSD but a local spare PSD or a global spare PSD as well. After the storage virtualization controller (SVC) is aware of the existence of a failed normally-used PSD inside the SVS in step 600, the SVC would reference the spare table formed during switching on or the updating procedure of the SVS to find if the logical media unit (LMU) of the failed normally-used PSD has a recorded local spare PSD or not in step 610. If the answer of the step 610 is "Yes", the SVC would update the associated configuration information stored both in the PSD(s) and the memory of the SVC of the found spare PSD in step 670 to eliminate the recording of a spare PSD, and then rebuild the data of the failed normally-used PSD in the local spare PSD in step 680. If the answer of the step 610 is "No", the SVC would check the spare table again to see if the designated PSD pool of the failed normally-used PSD provides any recorded pool spare PSD or not in step 620. If the SVC finds that the PSD pool of the failed normally-used PSD has one or more pool spare PSDs according to the spare table, then the SVC determines if the found one or more pool spare PSDs are available or not in step 630, such as but not limited to, the storage volume or the type of the one or more pool spare PSDs is able to rebuild the data stored in the failed normally-used PSD, and at the same time, the data integrity of the SVC is protected. If one of the found one or more pool spare PSDs is available for the rebuilding of the failed normally-used PSD, the SVC would update the associated configuration information stored both in the PSD(s) therein and in the memory of the SVC of the available spare PSD in step 670, and then rebuild the data stored in the failed normally-used PSD in the available pool PSD in step 680. If the SVC determines that all of the found one or more pool spare PSDs are not available for the failed normally-used PSD in step 630, the SVC would further reference to the spare table again to see if the SVS provides any global spare PSD in step 640. If the SVS doesn't provide any global spare PSD, the control flow goes straight to step 660, which is that the SVC can't rebuild the data stored in the failed normally-used PSD. If the answer of step 640 is "Yes", then the SVC determines if any of the found one or more global spare PSDs are available or not in step 650. If the SVC determines that one of the found one or more global spare PSDs is available in step 650, the SVC would update the associated configuration information stored both in the PSD(s) and the memory of the SVC of the available spare PSD in step 670, and then rebuild the data stored in the failed normally-used PSD in the available global spare PSD in step 680. If the SVC determines that none of the found one or more global spare PSDs is available in step 650, the data stored in the failed normally-used PSD cannot be rebuilt.

In the present embodiment, the reason why a found local spare PSD does not need to be determined if it is available or not is that the determination has been processed when users or the SVC intend(s) to designate a PSD to be a local spare PSD, and only if the PSD was determined available to all of the normally-used PSD(s) within the designated LMU, then the PSD would be designated as a local spare PSD. While in another embodiment, the control flow may comprise a further step to check whether or not any of the found local spare PSD(s) is available between the step 610 and 670 shown in FIG. 6. In a further embodiment, any or both of the step 630 and 650 can be omitted because the determination of the step 630 or 650 has been made in advance in the same manner that is described in the foregoing statement of the embodiment shown in FIG. 6. In one more embodiment, the order of the step 610, 620, 640 shown in FIG. 6 could be exchanged with each other. For example, the step 620 of the control flow shown in FIG. 6 could be exchanged with the step 640, and also the step 630 is exchanged with the step 650. And in another embodiment, the step 670 shown in FIG. 6 could be exchanged with step 680.

Although in the above-mentioned embodiment, the pool spare PSD is illustrated to be used as a substitute for a failed PSD in data rebuilding, it is intended that the function of the pool spare PSD is not restricted thereto but can be a backup PSD for the PSD pool whenever necessary. For example, when the SVC determines that a normally-used PSD is going to fail within a period of time but has not failed yet, hereinafter referred to "dying", the SVC could reference the spare table to find an available pool spare PSD to be a substitute for the dying normally-used PSD, rather than waiting for it to become a failed PSD. In such a situation, the control flow shown in FIG. 6 to find an available spare PSD as a substitute still works for a dying normally-used PSD by simply replacing the term "failed PSD" with "dying PSD", and the rebuilds function with the desired function (such as "replacing function" in the case with the "dying PSD").

All the drawings and illustrations described in the foregoing statement are only exemplary implementations and not intended to limit the scope of the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for selecting a spare physical storage device to use in a data storage virtualization subsystem comprising a plurality of normally-used physical storage devices, the method comprising the steps of:
   defining at least one section of the plurality of normally-used physical storage devices as a logical media unit;
   defining at least one of the plurality of normally-used physical storage devices as a physical storage device pool according to a pool ID for identifying the physical storage device pool;
   providing a pool spare physical storage device designated to said physical storage device pool and providing at least one non-pool spare physical storage device;
   selecting the pool spare physical storage device as a spare physical storage device for replacing one of the plurality of normally-used physical storage devices in the physical storage device pool when the one of the plurality of normally-used physical storage devices is to be replaced, if the pool spare physical storage device is available, wherein the pool spare physical storage device is used as a spare physical storage device for the physical storage device pool; and
   selecting the at least one non-pool spare physical storage device as a spare physical storage device for replacing the one of plurality of normally-used physical storage devices in the physical storage device pool when the one of the plurality of normally-used physical storage devices is to be replaced, if the pool spare physical storage device is not available.

2. The method of claim 1, wherein said at least one non-pool spare physical storage device comprises a local spare physical storage device.

3. The method of claim 1, wherein said at least one non-pool spare physical storage device comprises a global spare physical storage device.

4. The method of claim 1, wherein said at least one non-pool spare physical storage device comprises a local spare physical storage device and a global spare physical storage device, and said method further comprises, in the at least one non-pool spare physical storage selecting step, the step of:
   selecting the local spare physical storage device as a spare physical storage device for replacing the one of the plurality of normally-used physical storage devices in the physical storage device pool when the one of the plurality of normally-used physical storage devices is to be replaced, if the pool spare physical storage device is not available.

5. The method of claim 4, further comprising, in the at least one non-pool spare physical storage device selecting step, the step of selecting the global spare physical storage device as a spare physical storage device for replacing the one of the plurality of normally-used physical storage devices in the physical storage device pool when the one of the plurality of normally-used physical storage devices is to be replaced, if the local spare physical storage device is not available.

6. A method for selecting a spare physical storage device to use in a data storage virtualization subsystem comprising a plurality of normally-used physical storage devices, the method comprising the steps of:
   defining at least one section of the plurality of normally-used physical storage devices as a logical media unit;
   defining at least one of the plurality of normally-used physical storage devices as a physical storage device pool according to a pool ID for identifying the physical storage device pool;
   providing a pool spare physical storage device designated to said physical storage device pool and providing at least one local spare physical storage device;
   selecting the local spare physical storage device as a spare physical storage device for replacing one of the plurality of normally-used physical storage devices in the physical storage device pool when the one of the plurality of normally-used physical storage devices is to be replaced, if the local spare physical storage device is available; and
   selecting the pool spare physical storage device as a spare physical storage device for replacing the one of the plurality of normally-used physical storage devices in the physical storage device pool when the one of the plurality of normally-used physical storage devices is to be replaced, if the local spare physical storage device is not available.

7. The method of claim 6, wherein the data storage virtualization subsystem further comprises at least one global spare physical storage device and the method further comprises the steps of selecting the global spare physical storage device as a spare physical storage device for replacing the one of the plurality of normally-used physical storage devices in the physical storage device pool when the one of the normally-used physical storage devices is to be replaced, if the local spare and the pool spare physical storage devices are not available.

8. A method for selecting a spare physical storage device to use in a data storage virtualization subsystem comprising a plurality of normally-used physical storage devices, the method comprising the steps of:

defining at least one section of the plurality of normally-used physical storage devices as a logical media unit;

defining at least one of the plurality of normally-used physical storage devices as a physical storage device pool according to a pool ID for identifying the physical storage device pool;

providing a pool spare physical storage device designated to said physical storage device pool and providing at least one global spare physical storage device;

selecting the pool spare physical storage device as a spare physical storage device for replacing one of the plurality of normally-used physical storage devices in the physical storage device pool when the one of the plurality of normally-used physical storage devices is to be replaced, if the pool spare physical storage device is available; and selecting the global spare physical storage device as a spare physical storage device for replacing the one of the plurality of normally-used physical storage devices in the physical storage device pool when the one of the plurality of normally-used physical storage devices is to be replaced, if the pool spare physical storage device is not available.

9. The method of claim 1, 6, or 8, wherein said physical storage device pool comprises at least one enclosure for receiving the plurality of normally-used physical storage devices.

10. The method of claim 9, wherein said physical storage device pool comprises one enclosure for receiving the plurality of normally-used physical storage devices, and the pool spare physical storage device is an enclosure spare physical storage device.

11. The method of claim 9, wherein said physical storage device pool comprises a plurality of enclosures for receiving a plurality of the normally-used physical storage devices.

* * * * *